(12) United States Patent
Han

(10) Patent No.: US 11,395,991 B2
(45) Date of Patent: Jul. 26, 2022

(54) METAL-ORGANIC FRAMEWORK FILTER AND PREPARATION METHOD THEREOF

(71) Applicant: Ketai (Beijing) Technology Co., Ltd., Beijing (CN)

(72) Inventor: Ruodan Han, Beijing (CN)

(73) Assignee: Ketai (Beijing) technology Co., Ltd., Beijing (CN)

(*) Notice: Subject to any disclaimer, the term of this patent is extended or adjusted under 35 U.S.C. 154(b) by 668 days.

(21) Appl. No.: 15/764,109

(22) PCT Filed: Jul. 26, 2016

(86) PCT No.: PCT/CN2016/091783
§ 371 (c)(1),
(2) Date: Mar. 28, 2018

(87) PCT Pub. No.: WO2017/054565
PCT Pub. Date: Apr. 6, 2017

(65) Prior Publication Data
US 2018/0257041 A1    Sep. 13, 2018

(30) Foreign Application Priority Data
Sep. 29, 2015  (CN) .................. 201510630401.X

(51) Int. Cl.
| B01D 67/00 | (2006.01) |
| C07F 3/00 | (2006.01) |
| B01J 20/28 | (2006.01) |
| B01D 53/02 | (2006.01) |
| B01J 20/22 | (2006.01) |
| B01D 71/02 | (2006.01) |
| C07F 1/00 | (2006.01) |
| B01D 71/48 | (2006.01) |
| B01D 71/62 | (2006.01) |

(52) U.S. Cl.
CPC ......... B01D 67/0079 (2013.01); B01D 53/02 (2013.01); B01D 71/022 (2013.01); B01D 71/028 (2013.01); B01D 71/48 (2013.01); B01D 71/62 (2013.01); B01J 20/226 (2013.01); B01J 20/28033 (2013.01); C07F 1/00 (2013.01); C07F 3/003 (2013.01); *B01D 2253/204* (2013.01); *B01D 2323/08* (2013.01); *B01D 2323/10* (2013.01)

(58) Field of Classification Search
CPC .......................... B01D 67/0079; B01D 53/02
See application file for complete search history.

(56) References Cited

U.S. PATENT DOCUMENTS

| 4,640,904 A * | 2/1987 | Hillig ................ C04B 35/18 264/125 |
| 2004/0079648 A1* | 4/2004 | Khan ................ C25D 15/02 205/271 |
| 2004/0159552 A1* | 8/2004 | Khan ................ C23C 30/00 205/112 |
| 2010/0047614 A1* | 2/2010 | Brinley .............. C23C 4/06 428/615 |
| 2014/0033780 A1* | 2/2014 | Kim ................ C22C 38/54 72/46 |
| 2016/0254567 A1* | 9/2016 | Cai ................. H01M 10/0564 429/306 |

FOREIGN PATENT DOCUMENTS

| CN | 101693168 | | 4/2010 | |
| CN | 102886244 A | * | 1/2013 | |
| CN | 103599752 A | * | 2/2014 | |
| CN | 103820850 | | 5/2014 | |
| CN | 104478907 A | * | 4/2015 | |
| CN | 105348198 | | 2/2016 | |
| CN | 105348198 A | * | 2/2016 | ......... B01D 67/0079 |
| WO | WO 2012/138750 | | 10/2012 | |

OTHER PUBLICATIONS

Chen (NPL, Feb. 2016 ) https://onlinelibrary.wiley.com/doi/full/10.1002/anie.201511063 (journal publication) & https://onlinelibrary.wiley.com/action/downloadSupplement?doi=10.1002%2Fanie.201511063&file=anie201511063-sup-0001-misc_jnformation.pdf (supporting information supplement) (Year: 2016).*

* cited by examiner

*Primary Examiner* — Nicholas R Krasnow
(74) *Attorney, Agent, or Firm* — IP & T Group LLP

(57) ABSTRACT

The present disclosure discloses a method for preparing a metal-organic framework filter comprising the steps of bringing metal sources into contact with organic ligands and forming a metal-organic framework filter on substrates by a hot-pressing method. By the method of the present disclosure, a large amount of metal-organic framework filters with high purity can be obtained quickly and easily, thereby realizing industrialized production and application and the method has such advantages as low cost, simple operation, rapid production, batch product and high purity.

19 Claims, 5 Drawing Sheets

METAL-ORGANIC FRAMEWORK FILTER AND PREPARATION METHOD THEREOF

CROSS-REFERENCE TO RELATED APPLICATIONS

This application is a national stage application of PCT/CN2016/091783 filed on Jul. 26, 2016, which claims the priority of Chinese Patent Application No. 201510630401.X, filed on Sep. 29, 2015. The disclosure of each of the foregoing applications is incorporated herein in its entirety by reference.

FIELD OF TECHNOLOGY

The present disclosure relates to the field of applied chemistry, in particular to a method for preparing a metal-organic framework filter.

BACKGROUND

As a kind of crystalline porous material, metal-organic frameworks consist of metal clusters or metal ions and organic ligands by coordination effect. They combine the advantages of both inorganic and organic pore materials, have such characteristics as high specific surface area, order and repeatable channel, good stability and diverse structure and are rich in functional groups. The metal-organic framework membrane, as one of the important application fields of the metal-organic frameworks, is widely used in many directions such as gas separation, catalysis, and sensors. At present, the preparation methods of the metal-organic framework membrane mainly comprise in-situ growth method, LBL (Layer-by-layer) deposition method, crystal-seed method and ultrasonic chemistry method.

The in-situ growth method comprises the steps of directly placing a filter-forming substrate into reaction solution and allowing metal-organic framework crystals to grow on the surface of the substrate. Although this method has the advantage of simple operation, it has such deficiencies as long reaction time, excessive impurities, easiness in generation of filter defects and difficulty in expanding the production. The LBL deposition method comprises the steps of pre-modifying the surface of a substrate with organic groups firstly and then placing the substrate into metal solution and organic ligand solution by turns to obtain the metal-organic framework membrane. Although this method has the advantages of simple operation and high purity of the product, it has such deficiencies as long processing time and difficulty in expanding the production. The crystal-seed method comprises the steps of pre-coating crystal seeds on the surface of a substrate and then placing the substrate in reaction solution to form filters by the in-situ growth method. Although this method compensates for such deficiencies as easiness in generation of membrane defects and excessive impurities of the in-situ growth method to some extent, it has such disadvantages as long reaction time and difficulty in expanding the production. The ultrasonic chemistry method is a new method developed in recent years and comprises the step of performing ultrasonic treatment on reaction solution in which a substrate is placed to obtain the metal-organic framework membrane. Although this method has such advantages as mild reaction conditions (i.e., the reaction can be performed at room temperature) and relatively faster reaction speed, the products have a large number of defects and inadequate purity and it is difficult to expand the production by this method.

In general, since the current preparation methods have the disadvantages of long production cycles, insufficient batch production capacity, low yields, and relatively high production costs, they need to be improved.

SUMMARY

An object of the present disclosure is to provide a method for preparing a metal-organic framework filter comprising the steps of mixing metal sources with organic ligands and forming a metal-organic framework filter on substrates by a hot-pressing method.

In the method of the present disclosure, metal ions in the metal sources include at least one of the groups consisting of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}_a$, $Cr_{3+}$, $Mo_{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2-}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb5+$, $Sb^{3-}$, $Sb^{+}$, $Bi^{5+}$, $Bi^{3+}$ and $Bi^{+}$.

Preferably, the metal ions in the metal sources include at least one of the groups consisting of $Zn^{2+}$, $Co^{2+}$, or $Cd^{2+}$.

In the method of the present disclosure, the coordination functional groups in the organic ligands include at least one of the groups consisting of $-CO_2H$, $-CS_2H$, $-NO_2$, $-OH$, $-NH2$, $-CN$, $-SO_3H$, $-SH$,

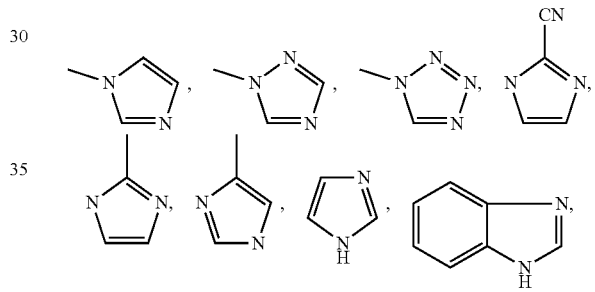

$-PO_4H_2$, $-AsO_3H$, $-AsO_4H$, $-CH(RSH)_2$, $-C(RSH)_3$, $-CH(RNH_2)_2$, $-C(RNH_2)_3$, $-CH(ROH)_2$, $-C(ROH)_3$, $-CH(RCN)_2$, $-C(RCN)_3$, $-CH(NH_2)_2$, $-C(NH_2)_3$, $-CH(CN)_2$ and $-C(CN)_3$, wherein each R in the functional groups independently represents a hydrocarbon group containing 1 to 5 benzene rings.

Preferably, the coordination functional groups in the organic ligands include at least one of groups consisting of $-CO_2H$,

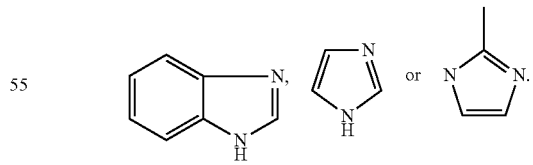

In the method of the present disclosure, the usage amount of the metal sources is 0.001 mol to 5 mol with respect to 1 mol of the organic ligands.

In the method of the present disclosure, the hot-pressing method has a hot-pressing temperature of 80° C. to 300° C., a hot-pressing pressure of 0.005 MPa to 6 MPa, a hot-pressing time of 3 minutes to 120 minutes and an adjustable hot-pressing area.

In the method of the present disclosure, the substrates include at least one of the groups consisting of anodic aluminum oxide, non-woven fabric, carbon cloth, foamed nickel, copper foils, glass fiber cloth, glass fiber yarns, quartz substrates, glass substrates and silicon substrates.

Preferably, the substrates include at least one of the groups consisting of carbon cloth, foamed nickel or copper foils.

In the method of the present disclosure, the process in which the metal sources are brought into contact with the organic ligands is performed with an additive including at least one of the groups consisting of polyacrylic acid, polyacrylonitrile, polybutylene, polybutyl acrylate, polyethylene, polyethylene oxide, polyacrylic ester, polyethylene glycol, polyisobutylene, polyisobutylene oxide, polymethyl acrylate, polymethyl methacrylate, polypropylene, polystyrene, polyvinyl alcohol, polyvinyl chloride, and polyvinyl pyrrolidone.

Preferably, the additive is polyvinyl alcohol (preferably having a molecular weight of 16,000), polyethylene glycol (preferably having a molecular weight of 4,000), polyvinyl pyrrolidone (preferably having a molecular weight of 40,000) and/or polyacrylonitrile (preferably having a molecular weight of 150,000).

Preferably, the usage amount of the additive is 0.001 mol to 0.05 mol with respect to 1 mol of the organic ligands.

More preferably, in the method of the present disclosure, the metal source is anhydrous zinc acetate, the organic ligand is 2-methylimidazole, the substrate is copper foil, and the additive is polyethylene glycol (preferably having a molecular weight of 4,000).

More preferably, in the method of the present disclosure, the metal source is zinc nitrate hexahydrate, the organic ligand is 2-aminoterephthalic acid, the substrate is foamed nickel, and the additive is polyvinyl alcohol (preferably, having the molecular weight of 16,000).

More preferably, in the method of the present disclosure, the metal source is cobalt nitrate hexahydrate, the organic ligand is benzimidazole, the substrate is carbon cloth, and the additive is polyvinyl pyrrolidone (preferably, having the molecular weight of 40,000).

More preferably, in the method of the present disclosure, the metal source is cadmium nitrate tetrahydrate, the organic ligand is imidazole, the substrate is carbon cloth, and the additive is polyacrylonitrile (preferably, having a molecular weight of 150,000).

More preferably, in the method of the present disclosure, the metal source is cobalt nitrate hexahydrate, the organic ligand is imidazole, the substrate is carbon cloth, and the additive is polyvinyl pyrrolidone (preferably, having the molecular weight of 40,000).

By the method of the present disclosure, a high-purity metal-organic framework filter can be obtained easily and fast in a large batch. The metal-organic framework filter prepared by present disclosure has such advantages as low cost, simple operation, rapid production, batch products and high purity.

BRIEF DESCRIPTION OF THE DRAWINGS

The accompanying drawings are provided for a further understanding of the present disclosure and constitute a part of the specification together with the following detailed description to serve to explain the present disclosure, but do not constitute a limitation to the present disclosure. In the drawing.

DESCRIPTION OF THE EMBODIMENTS

Figure 1:
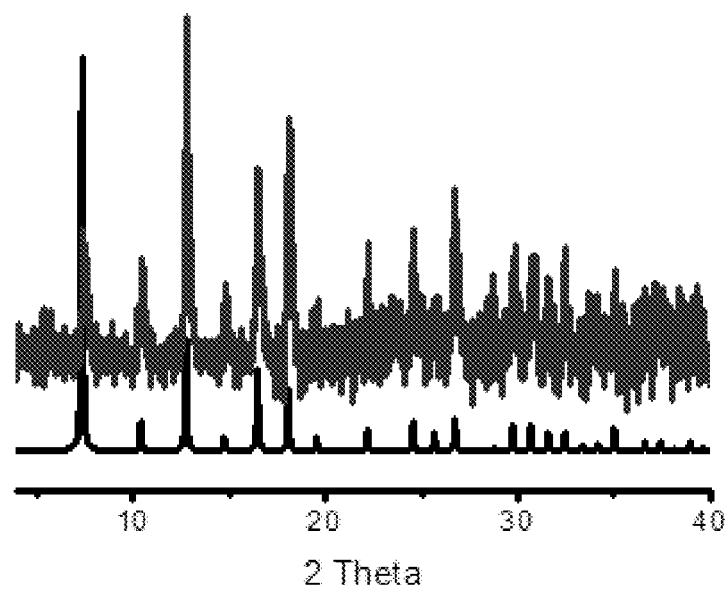
FIG. 1 is X-ray powder diffraction pattern of the metal-organic framework filter obtained in embodiment 1.

Hereinafter, the specific embodiments of the present disclosure will be described in detail with reference to the accompanying drawings. It should be understood that the specific embodiments described herein are only used to illustrate and explain the present disclosure and are not intended to limit the present disclosure.

The present disclosure provides a method for preparing a metal-organic framework filter comprising the steps of mixing metal ions with organic ligands and forming a metal-organic framework filter on substrates by a hot-pressing method. The metal ions are coordinated to the organic linkers to form the secondary building units (SBUs), furthermore to construct the whole frameworks on the substrates that act as the support layers of the metal-organic framework filter.

The metal-organic framework filter prepared by the method of the present disclosure has a porous mesh structure.

The metal sources may be a metal salt and/or a metal oxide. The metal ions in the metal sources include at least one of the groups consisting of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2-}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2-}$, $Co^{3+}$, $Co^{2+}$, $Rh^{2+}$, $Rh^{+}$, $Ir^{2+}$, $Ir^{-}$, $Ni^{2+}$, $Ni^{+}$, $Pd^{2+}$, $Pd^{+}$, $Pt^{2+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2-}$, $Ge^{4+}$, $Ge^{2+}$, $Sn^{4+}$, $Sn^{2+}$, $Pb^{4+}$, $Pb^{2+}$, $As^{5+}$, $As^{3-}$, $As^{+}$, $Sb^{5+}$, $Sb^{3+}$, $Sb^{+}$, $Bi^{5+}$, $Bi^{3+}$ and $Bi^{+}$. Preferably, the metal ions in the metal sources include at least one of the groups consisting of $Zn^{2+}$, $Co^{2+}$ and/or $Cd^{2+}$.

In the method of the present disclosure, the organic ligands refer to organic ligands containing one or more coordination functional groups in its molecular structure. In one of embodiments, the coordination functional groups in the organic ligands may be various functional groups capable of forming coordinate bonds with metal ions, including at least one of the groups consisting of —$CO_2H$, —$NO_2$, —OH, —NH2, —CN, —$SO_3H$, —SH,

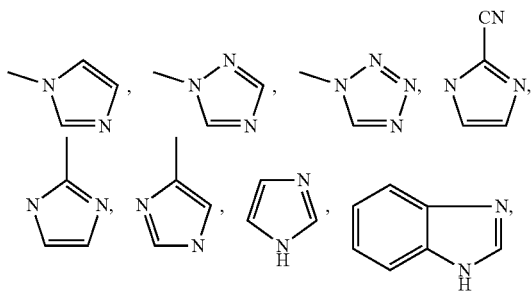

—PO₄H₂, —AsO₃H, —AsO₄H, —CH(RSH)₂, —C(RSH)₃, —CH(RNH₂)₂, —C(RNH₂)₃, —CH(ROH)₂, —C(ROH)₃, —CH(RCN)₂, —C(RCN)₃, —CH(NH₂)₂, —C(NH₂)₃, —CH(CN)₂ and —C(CN)₃, wherein each R in the functional groups independently represents a hydrocarbon group containing 1 to 5 benzene rings.

Preferably, the coordination functional groups in the organic ligands include at least one of groups consisting of —CO₂H,

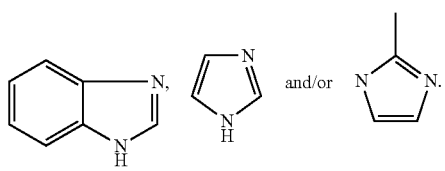

and/or

The organic ligands containing the above-mentioned coordination functional groups are exemplified below. For example, the organic ligands include terephthalic acid, trimesic acid, 2-nitroterephthalic acid, 2-hydroxyterephthalic acid, 2,5-dihydroxyterephthalic acid, 2-aminoterephthalic acid, monosodium 2-sulfoterephthalate, 5-aminoisophthalic acid, 5-nitroisophthalic acid, 4-hydroxyisophthalic acid, monosodium 5-sulfoisophthalate, benzoic acid, 4,4'-biphenyldicarboxylic acid, 2,2'-dinitro-4,4'-biphenyldicarboxylic acid, 2,2'-diamino-4,4'-biphenyldicarboxylic acid, 2,2'-dihydroxy-4,4'-biphenyldicarboxylic acid, 3,3',5,5'-biphenyltetracarboxylic acid, dimercaptosuccinic acid, 1,4,5,8-naphthalenetetracarboxylic acid, 2,6-naphthalenedicarboxylic acid, naphthalene-1,4-dicarboxylic acid, O-phospho-DL-threonine, O-phospho-L-tyrosine, barium 3-phospho-D-glycerate, 3-mercaptopropionic acid, 3-amino-5-mercapto-1,2,4-triazole, 2,3-dimercaptosuccinic acid, 5-methoxy-2-mercaptobenzimidazole, 1-methyl-5-sulfoyltetrazole, imidazole, benzimidazole, 2-mercaptobenzimidazole, N,N-carbonyldiimidazole, 1-methylimidazole, 2-ethyl-4-methylimidazole, 2,4-dimethylimidazole, 2-methylimidazole, 4-methylimidazole, 2-nitroimidazole, 2-cyanoimidazole, 1,2-dimethylimidazole, imidazole-4,5-dicarboxylic acid, 4-amino-5-imidazolecarboxamide, 2-hydroxymethyl-1H-benzimidazole, 2-methylbenzimidazole, 5,6-dimethylbenzimidazole, 4,5-dicyanoimidazole, benzimidazole-5-carboxylic acid, 1H-imidazole-4-formic acid, 2-isopropylimidazole, 1-benzyl-2-methylimidazole, 4-nitroimidazole, 5-aminotetrazole monohydrate, tetrazole acetic acid, 1,2,4-triazole, triazole-3-carboxylic acid, 4-amino-4H-1,2,4-triazole, 3-nitro-1,2,4-triazole.

In one of embodiments, preferred organic ligands are 2-methylimidazole, benzimidazole, imidazole and/or 2-aminoterephthalic acid.

In the present disclosure, the usage amount of the metal sources may be 0.01 mol to 5 mol, preferably 0.05 mol to 4 mol, more preferably 0.1 mol to 3 mol, with respect to 1 mol of the organic ligands.

The hot-pressing method refers to allowing a tool or equipment with hot-pressing capability to operate for a certain hot-pressing time under a certain hot-pressing temperature and hot-pressing pressure. In one of embodiments, the hot-pressing tool or equipment can be a conventional hot-pressing tool, such as at least one of an electrically heating bar, an electrically heating plate and an electrically heating roller; the hot-pressing temperature can be 80° C. to 300° C., preferably 100° C. to 280° C., more preferably 120° C. to 250° C.; the hot-pressing pressure can be 0.005 MPa to 6 MPa, preferably 0.01 MPa to 4 MPa, more preferably 0.02 MPa to 2 MPa; the hot-pressing time may be 3 minutes to 120 minutes, preferably 5 minutes to 90 minutes, more preferably 10 minutes to 60 minutes.

In the method of the present disclosure, the metal-organic framework filter forms a porous mesh structure on the substrates, and the substrates provide support for forming the metal-organic framework filter by hot-pressing. The substrates include at least one of the groups consisting of carbon cloth, non-woven fabric, anodic aluminum oxide, foamed nickel, copper foils, glass fiber cloth, glass fiber yarns, quartz substrate, glass substrate, and silicon substrate. Preferred substrates include at least one of the groups consisting of carbon cloth, foamed nickel, or the copper foils.

In the method of the present disclosure, the process in which the metal sources are brought into contact with the organic ligands is performed with an additive. The usage amount of the additive is 0.001 mol to 0.05 mol with respect to 1 mol of the organic ligands. The additive includes at least one of the groups consisting of polyacrylic acid, polyacrylonitrile, polybutylene, polybutyl acrylate, polyethylene, polyethylene oxide, polyacrylic ester, polyethylene glycol, polyisobutylene, polyisobutylene oxide, polymethyl acrylate, polymethyl methacrylate, polypropylene, polystyrene, polyvinyl alcohol, polyvinyl chloride, and polyvinyl pyrrolidone. Preferably, the additive is polyvinyl alcohol (preferably having a molecular weight of 16,000), polyethylene glycol (preferably having a molecular weight of 4,000), polyvinyl pyrrolidone (preferably having a molecular weight of 40,000) and/or polyacrylonitrile (preferably having a molecular weight of 150,000).

In one of embodiments, particularly preferably, the organic ligands are 2-methylimidazole, benzimidazole, imidazole, and/or 2-aminoterephthalic acid; the metal sources are anhydrous zinc acetate, zinc nitrate hexahydrate, cobalt nitrate hexahydrate, and/or cadmium nitrate tetrahydrate; and the substrates are carbon cloth, foamed nickel and/or the copper foils.

In one of embodiments, preferably, the organic ligand is 2-methylimidazole, the metal source is anhydrous zinc acetate, the additive is polyethylene glycol (preferably having a molecular weight of 4,000) and the substrate is copper foil.

In one of embodiments, preferably, the organic ligand is 2-aminoterephthalic acid, the metal source is zinc nitrate hexahydrate, the additive is polyvinyl alcohol (preferably, having the molecular weight of 16,000) and the substrate is foamed nickel.

In one of embodiments, preferably, the organic ligand is benzimidazole, the metal source is cobalt nitrate hexahydrate, the additive is polyvinyl pyrrolidone (preferably, having the molecular weight of 40,000) and the substrate is a carbon cloth.

In one of embodiments, preferably, the organic ligand is imidazole, the metal source is cadmium nitrate tetrahydrate, the additive is polyacrylonitrile (preferably, having a molecular weight of 150,000) and the substrate is a carbon cloth.

In one of embodiments, preferably, the organic ligand is imidazole, the metal source is cobalt nitrate hexahydrate, the additive is polyvinyl pyrrolidone (preferably, having the molecular weight of 40,000) and the substrate is a carbon cloth.

The present disclosure will be further described in detail by way of embodiments below.

Embodiment 1

A metal source (anhydrous zinc acetate) was mixed well with an organic ligand (2-methylimidazole) and an additive (polyethylene glycol having the molecular weight of 4,000) to obtain a mixture in which the usage amount of the metal source is 0.1 mol and that of polyethylene glycol is 0.005 mol with respect to 1 mol of the organic ligand. The mixture was evenly applied to a copper foil (4 cm×4 cm) as a substrate and the hot pressing is performed at the hot-pressing temperature of 220° C. and hot-pressing pressure of 0.2 MPa for the hot-pressing time of 25 minutes. A metal-organic framework material was obtained on the copper foil as the substrate so as to prepare the metal-organic framework filter.

Figure 2:
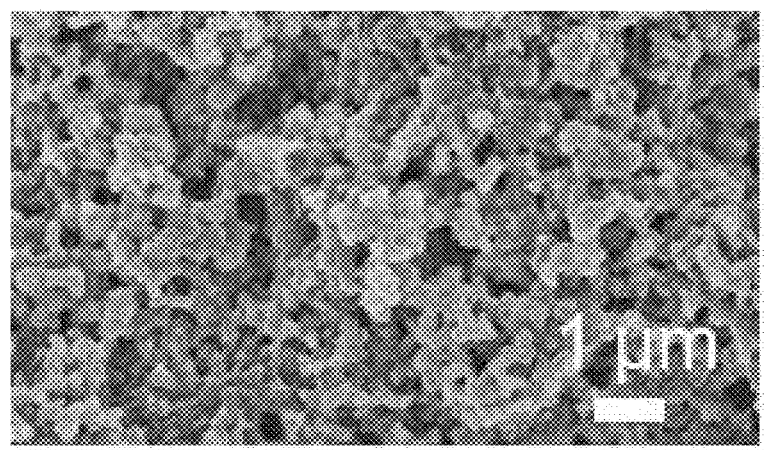
FIG. 2 is scanning electron microscope (SEM) graph of the metal-organic framework filter obtained in embodiment 1.

The material above was washed repeatedly with ethanol and dimethylformamide and dried to obtain a purified metal-organic framework filter. The loading amount of the metal-organic framework material on the filter was 10.37 g/m². An X-ray powder diffraction analysis and scanning electron microscopy analysis were performed on the metal-organic framework filter by an X-ray powder diffractometer (a model: Bruker D8 Advance) and a scanning electron microscope (SEM) (a model: S480), respectively, wherein the X-ray powder diffractometer has a test interval of 4-40° and a scanning speed of 4° per minute; the SEM has the following scanning parameters: an acceleration voltage of 5 kv, an operating distance of 9.3 mm, a magnification of 450,000 times and a length scale of 1 The results show that the metal-organic framework material was successfully obtained on the copper foil as the substrate by a hot-pressing method so as to prepare the metal-organic framework filter. The X-ray powder diffraction pattern of the metal-organic framework filter is shown in FIG. 1. The X-ray powder diffraction curve (red) of the metal-organic framework material obtained after hot-pressing coincides with the monocrystal simulation curve (black), indicating that the metal-organic framework material was successfully obtained; the SEM graph is shown in FIG. 2, the metal-organic framework material was grown on the copper foil as the substrate after hot-pressing, indicating that the metal-organic framework filter was successfully obtained.

Embodiment 2

A metal source (zinc nitrate hexahydrate) was mixed well with an organic ligand (2-aminoterephthalic acid) and an additive (polyvinyl alcohol having the molecular weight of 16,000) to obtain a mixture in which the usage amount of the metal source is 1 mol and that of polyvinyl alcohol is 0.001 mol with respect to 1 mol of the organic ligand. The mixture was evenly applied to foamed nickel (4 cm×4 cm) as a substrate and the hot pressing is performed at the hot-pressing temperature of 85° C. and hot-pressing pressure of 0.2 MPa for the hot-pressing time of 120 minutes. A metal-organic framework material was obtained on foamed nickel as the substrate so as to prepare the metal-organic framework filter.

Figure 3:
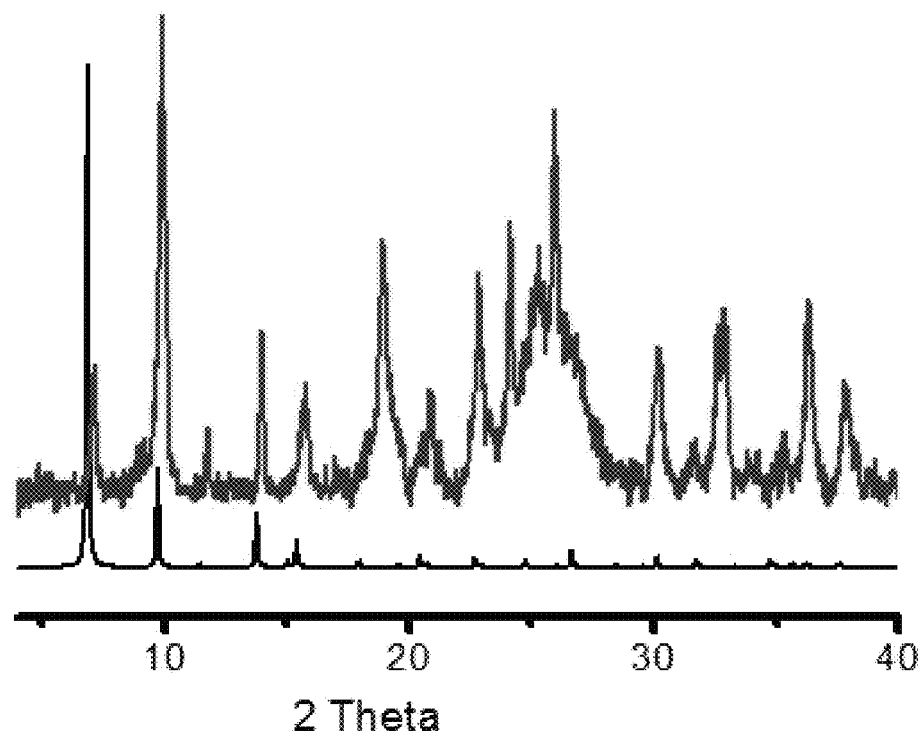
FIG. 3 is X-ray powder diffraction pattern of the metal-organic framework filter obtained in embodiment 2.
Figure 4:
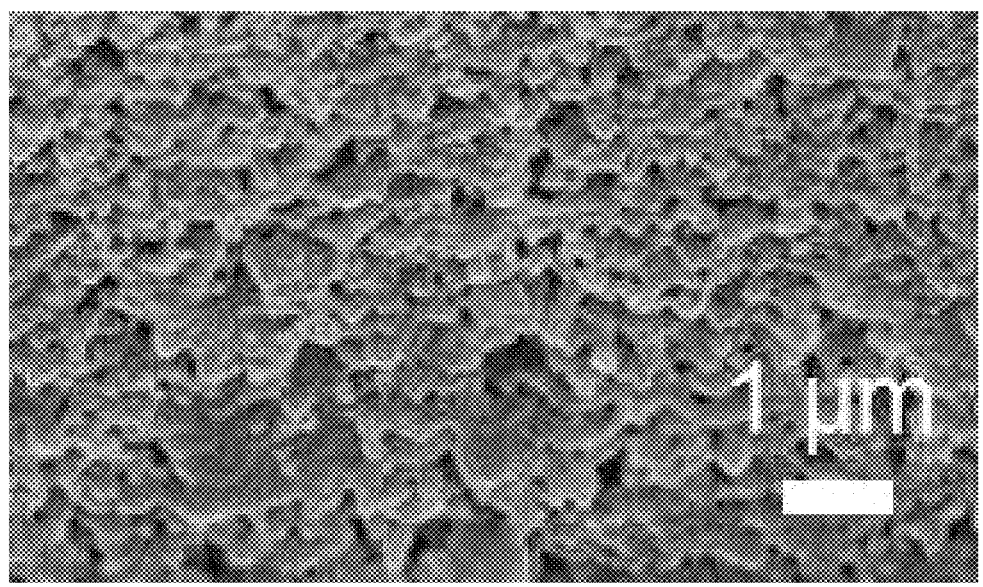
FIG. 4 is SEM graph of the metal-organic framework filter obtained in embodiment 2.

The material above was washed repeatedly with ethanol and dimethylformamide and dried to obtain a purified metal-organic framework filter. The loading amount of the metal-organic framework material on the filter was 6.03 g/m². An X-ray powder diffraction analysis and scanning electron microscopy analysis were performed on the metal-organic framework filter by an X-ray powder diffractometer (a model: Bruker D8 Advance) and a scanning electron microscope (SEM) (a model: S480), respectively, wherein the X-ray powder diffractometer has a test interval of 4-40° and a scanning speed of 4° per minute; the SEM has the following scanning parameters: an acceleration voltage of 5 kv, an operating distance of 9.3 mm, a magnification of 450,000 times and a length scale of 1 μm. The results show that the metal-organic framework material was successfully obtained on the foamed nickel as the substrate by a hot-pressing method so as to prepare the metal-organic framework filter. The X-ray powder diffraction pattern of the metal-organic framework filter is shown in FIG. 3. The X-ray powder diffraction curve (red) of the metal-organic framework material obtained after hot-pressing coincides with the monocrystal simulation curve (black), indicating that the metal-organic framework material was successfully obtained; the SEM graph is shown in FIG. 4, the metal-organic framework material was grown on the foamed nickel as the substrate after hot-pressing, indicating that the metal-organic framework filter was successfully obtained.

Embodiment 3

A metal source (cobalt nitrate hexahydrate) was mixed well with an organic ligand (benzimidazole) and an additive (polyvinylpyrrolidone having the molecular weight of 40,000) to obtain a mixture in which the usage amount of the metal source is 0.01 mol and that of polyvinylpyrrolidone is 0.002 mol with respect to 1 mol of the organic ligand. The mixture was evenly applied to carbon cloth (4 cm×4 cm) as a substrate and the hot pressing is performed at the hot-pressing temperature of 120° C. and hot-pressing pressure of 0.2 MPa for the hot-pressing time of 70 minutes. A metal-organic framework material was obtained on carbon cloth as the substrate so as to prepare the metal-organic framework filter.

Figure 5:
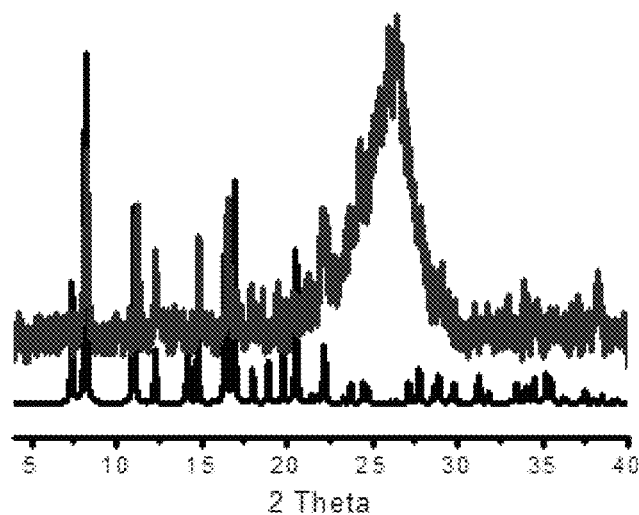
FIG. 5 is X-ray powder diffraction pattern of the metal-organic framework filter obtained in embodiment 3.
Figure 6:
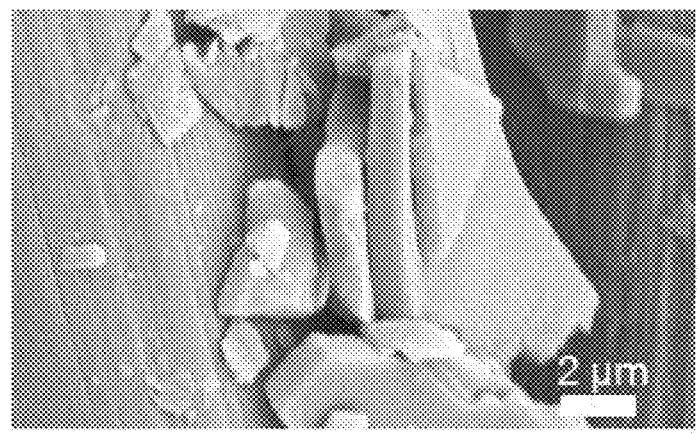
FIG. 6 is SEM graph of the metal-organic framework filter obtained in embodiment 3.

The material above was washed repeatedly with ethanol and dimethylformamide and dried to obtain a purified metal-organic framework filter. The loading amount of the metal-organic framework material on the filter was 8.06 g/m². An X-ray powder diffraction analysis and scanning electron microscopy analysis were performed on the metal-organic framework filter by an X-ray powder diffractometer (a model: Bruker D8 Advance) and a scanning electron microscope (SEM) (a model: S480), respectively, wherein the X-ray powder diffractometer has a test interval of 4-40° and a scanning speed of 4° per minute; the SEM has the following scanning parameters: an acceleration voltage of 5 kv, an operating distance of 9.3 mm, a magnification of 450,000 times and a length scale of 2 μm. The results show that the metal-organic framework material was successfully obtained on the carbon cloth as the substrate by a hot-pressing method so as to prepare the metal-organic framework filter. The X-ray powder diffraction pattern of the metal-organic framework filter is shown in FIG. 5. The X-ray powder diffraction curve (red) of the metal-organic framework material obtained after hot-pressing coincides with the monocrystal simulation curve (black), indicating that the metal-organic framework material was successfully obtained; the SEM graph is shown in FIG. 6, the metal-organic framework material was grown on the carbon cloth as the substrate after hot-pressing, indicating that the metal-organic framework filter was successfully obtained.

Embodiment 4

A metal source (cadmium nitrate tetrahydrate) was mixed well with an organic ligand (imidazole) and an additive (polyacrylonitrile having the molecular weight of 150,000) to obtain a mixture in which the usage amount of the metal source is 0.5 mol and that of polyacrylonitrile is 0.02 mol with respect to 1 mol of the organic ligand. The mixture was evenly applied to carbon cloth (4 cm×4 cm) as a substrate and the hot pressing is performed at the hot-pressing temperature of 300° C. and hot-pressing pressure of 0.2 MPa for the hot-pressing time of 5 minutes. A metal-organic framework material was obtained on carbon cloth as the substrate so as to prepare the metal-organic framework filter.

Figure 7:
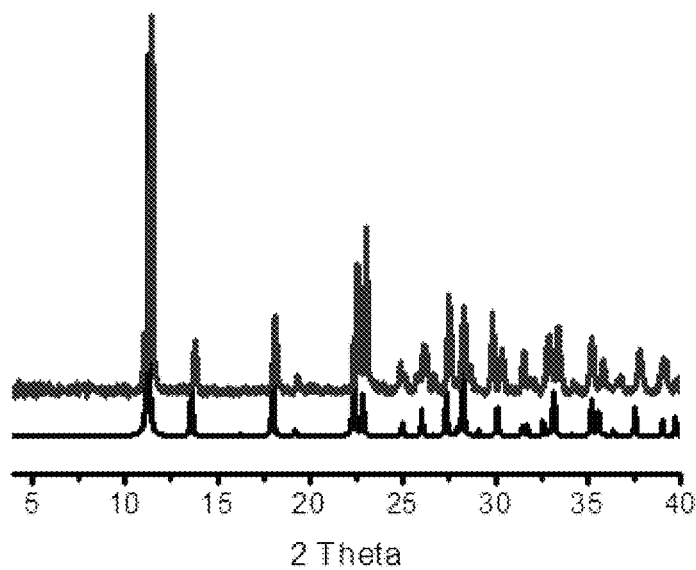
FIG. 7 is X-ray powder diffraction pattern of the metal-organic framework filter obtained in embodiment 4.
Figure 8:
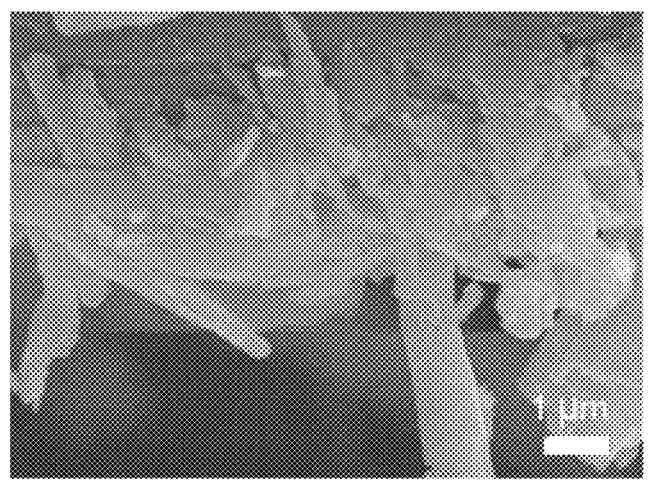
FIG. 8 is SEM graph of the metal-organic framework filter obtained in embodiment 4.

The material above was washed repeatedly with ethanol and dimethylformamide and dried to obtain a purified metal-organic framework filter. The loading amount of the metal-organic framework material on the filter was 2.27 $g/m^2$. An X-ray powder diffraction analysis and scanning electron microscopy analysis were performed on the metal-organic framework filter by an X-ray powder diffractometer (a model: Bruker D8 Advance) and a scanning electron microscope (SEM) (a model: S480), respectively, wherein the X-ray powder diffractometer has a test interval of 4-40° and a scanning speed of 4° per minute; the SEM has the following scanning parameters: an acceleration voltage of 5 kv, an operating distance of 9.3 mm, a magnification of 450,000 times and a length scale of 1 μm. The results show that the metal-organic framework material was successfully obtained on the carbon cloth as the substrate by a hot-pressing method so as to prepare the metal-organic framework filter. The X-ray powder diffraction pattern of the metal-organic framework filter is shown in FIG. 7. The X-ray powder diffraction curve (red) of the metal-organic framework material obtained after hot-pressing coincides with the monocrystal simulation curve (black), indicating that the metal-organic framework material was successfully obtained; the SEM graph is shown in FIG. 8, the metal-organic framework material was grown on the carbon cloth as the substrate after hot-pressing, indicating that the metal-organic framework filter was successfully obtained.

Embodiment 5

A metal source (cobalt nitrate hexahydrate) was mixed well with an organic ligand (imidazole) and an additive (polyvinylpyrrolidone having the molecular weight of 40,000) to obtain a mixture in which the usage amount of the metal source is 5 mol and that of polyvinylpyrrolidone is 0.1 mol with respect to 1 mol of the organic ligand. The mixture was evenly applied to carbon cloth (4 cm×4 cm) as a substrate and the hot pressing is performed at the hot-pressing temperature of 180° C. and hot-pressing pressure of 0.2 MPa for the hot-pressing time of 50 minutes. A metal-organic framework material was obtained on the carbon cloth as the substrate so as to prepare the metal-organic framework filter.

Figure 9:
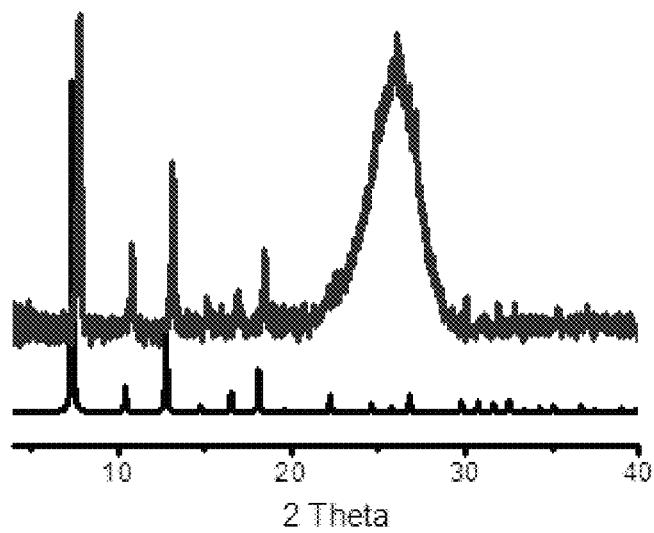
FIG. 9 is X-ray powder diffraction pattern of the metal-organic framework filter obtained in embodiment 5.
Figure 10:
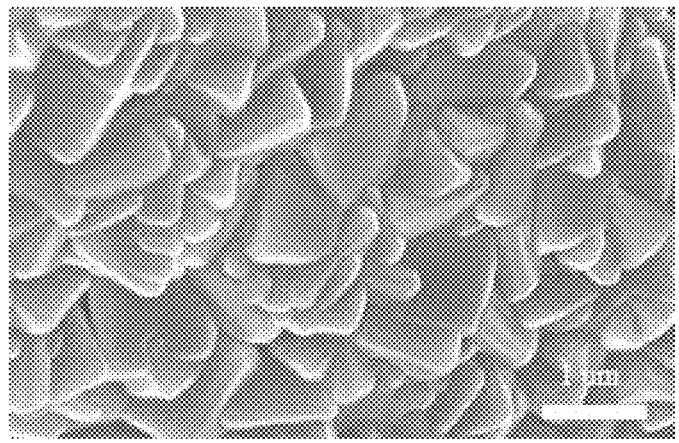
FIG. 10 is SEM graph of the metal-organic framework filter obtained in embodiment 5.

The material above was washed repeatedly with ethanol and dimethylformamide and dried to obtain a purified metal-organic framework filter. The loading amount of the metal-organic framework material on the filter was 9.89 $g/m^2$. An X-ray powder diffraction analysis and scanning electron microscopy analysis were performed on the metal-organic framework filter by an X-ray powder diffractometer (a model: Bruker D8 Advance) and a scanning electron microscope (SEM) (a model: S480), respectively, wherein the X-ray powder diffractometer has a test interval of 4-40° and a scanning speed of 4° per minute; the SEM has the following scanning parameters: an acceleration voltage of 5 kv, an operating distance of 9.3 mm, a magnification of 450,000 times and a length scale of 1 μm. The results show that the metal-organic framework material was successfully obtained on the carbon cloth as the substrate by a hot-pressing method so as to prepare the metal-organic framework filter. The X-ray powder diffraction pattern of the metal-organic framework filter is shown in FIG. 9. The X-ray powder diffraction curve (red) of the metal-organic framework material obtained after hot-pressing coincides with the monocrystal simulation curve (black), indicating that the metal-organic framework material was successfully obtained; the SEM graph is shown in FIG. 10, the metal-organic framework material was grown on the carbon cloth as the substrate after hot-pressing, indicating that the metal-organic framework filter was successfully obtained.

Embodiment 6

A metal source (anhydrous zinc acetate) was mixed well with an organic ligand (2-methylimidazole) and an additive (polyethylene glycol having the molecular weight of 4,000) to obtain a mixture in which the usage amount of the metal source is 0.1 mol and that of polyethylene glycol is 0.005 mol with respect to 1 mol of the organic ligand. The mixture was evenly applied to copper coil (4 cm×4 cm) as a substrate and the hot pressing is performed at the hot-pressing temperature of 220° C. and hot-pressing pressure of 0.01 MPa for the hot-pressing time of 25 minutes. A metal-organic framework material was obtained on copper coil as the substrate so as to prepare the metal-organic framework filter.

The material above was washed repeatedly with ethanol and dimethylformamide and dried to obtain a purified metal-organic framework filter. An X-ray powder diffraction analysis and scanning electron microscopy analysis were performed on the metal-organic framework filter, respectively, and the same results as those of embodiment 1 were obtained. The loading amount of the metal-organic framework material on the filter was 7.98 $g/m^2$.

Embodiment 7

A metal source (anhydrous zinc acetate) was mixed well with an organic ligand (2-methylimidazole) and an additive (polyethylene glycol having the molecular weight of 4,000) to obtain a mixture in which the usage amount of the metal source is 0.1 mol and that of polyethylene glycol is 0.005 mol with respect to 1 mol of the organic ligand. The mixture was evenly applied to copper coil (4 cm×4 cm) as a substrate and the hot pressing is performed at the hot-pressing temperature of 220° C. and hot-pressing pressure of 5 MPa for the hot-pressing time of 25 minutes. A metal-organic framework material was obtained on copper coil as the substrate so as to prepare the metal-organic framework filter.

The material above was washed repeatedly with ethanol and dimethylformamide and dried to obtain a purified metal-organic framework filter. An X-ray powder diffraction analysis and scanning electron microscopy analysis were performed on the metal-organic framework filter, respectively, and the same results as those of embodiment 1 were obtained. The loading amount of the metal-organic framework material on the filter was 6.11 g/m$^2$.

Embodiment 8

A metal source (anhydrous zinc acetate) was mixed well with an organic ligand (2-methylimidazole) and an additive (polyethylene glycol having the molecular weight of 4,000) to obtain a mixture in which the usage amount of the metal source is 0.1 mol and that of polyethylene glycol is 0.005 mol with respect to 1 mol of the organic ligand. The mixture was evenly applied to copper coil (40 cm×40 cm) as a substrate and the hot pressing is performed at the hot-pressing temperature of 220° C. and hot-pressing pressure of 0.2 MPa for the hot-pressing time of 25 minutes. A metal-organic framework material was obtained on copper coil as the substrate so as to prepare the metal-organic framework filter.

The material above was washed repeatedly with ethanol and dimethylformamide and dried to obtain a purified metal-organic framework filter. An X-ray powder diffraction analysis and scanning electron microscopy analysis were performed on the metal-organic framework filter, respectively, and the same results as those of embodiment 1 were obtained. The loading amount of the metal-organic framework material on the filter was 10.11 g/m$^2$.

Embodiment 9

A metal source (anhydrous zinc acetate) was mixed well with an organic ligand (2-methylimidazole) and an additive (polyethylene glycol having the molecular weight of 4,000) to obtain a mixture in which the usage amount of the metal source is 0.1 mol and that of polyethylene glycol is 0.005 mol with respect to 1 mol of the organic ligand. The mixture was evenly applied to copper coil (100 cm×100 cm) as a substrate and the hot pressing is performed at the hot-pressing temperature of 220° C. and hot-pressing pressure of 0.01 MPa for the hot-pressing time of 25 minutes. A metal-organic framework material was obtained on copper coil as the substrate so as to prepare the metal-organic framework filter.

The material above was washed repeatedly with ethanol and dimethylformamide and dried to obtain a purified metal-organic framework filter. An X-ray powder diffraction analysis and scanning electron microscopy analysis were performed on the metal-organic framework filter, respectively, and the same results as those of embodiment 1 were obtained. The loading amount of the metal-organic framework material on the filter was 8.02 g/m$^2$.

Comparative Example 1

A metal-organic framework membrane was grown on alumina as a substrate using an ultrasonic chemistry method.

1.65 mmol of organic ligand (2-aminoterephthalic acid) was added to 40 mL of dimethylformamide solvent to prepare a solution. The alumina as the substrate was placed in this solution and treated at 120° C. for 2 hours. After that, the alumina as the substrate was taken out and dried at room temperature to obtain a treated alumina substrate.

5 mmol of metal source (zinc nitrate hexahydrate), 1.65 mmol of organic ligand (2-aminoterephthalic acid) and 40 mL of dimethylformamide solvent were mixed well in a glass reactor and the treated alumina substrate was added. The ultrasound treatment was performed for 1 h at 400 W and 20 KHz so as to obtain a metal-organic framework filter.

The material above was washed repeatedly with dimethylformamide solvent for three times and dried to obtain a purified metal-organic framework filter.

Figure 11:
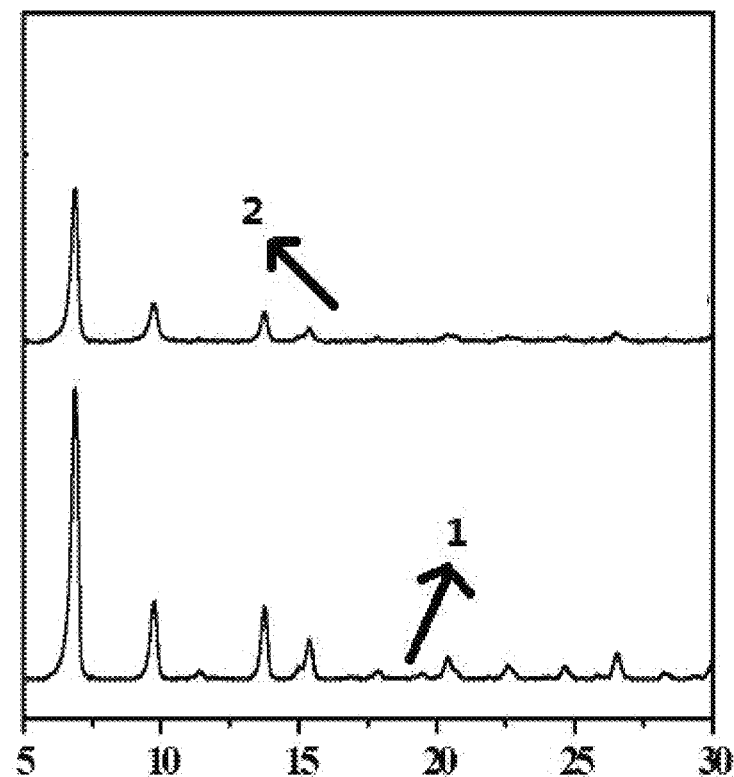
FIG. 11 is X-ray powder diffraction pattern of the metal-organic framework filter obtained in comparative example.
Figure 12:
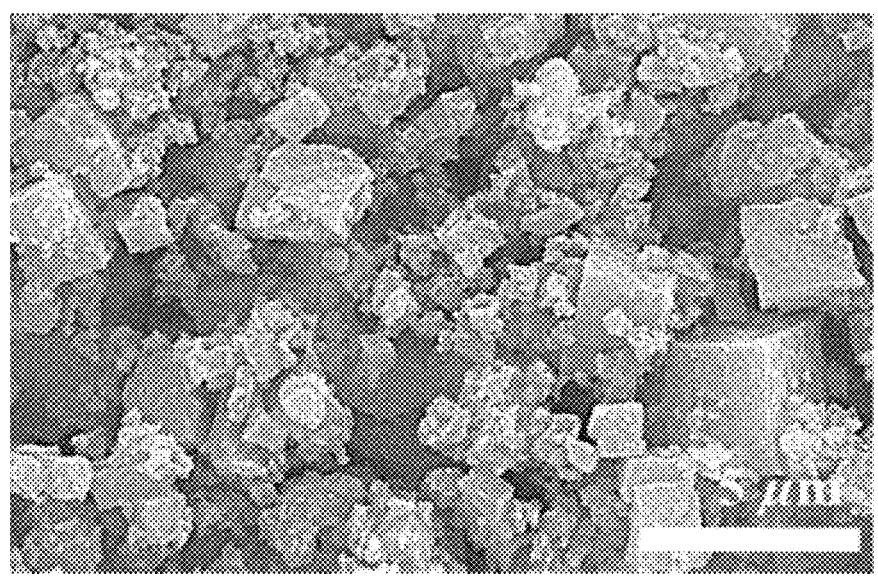
FIG. 12 is SEM graph of the metal-organic framework filter obtained in comparative example.

FIG. 11 is X-ray powder diffraction pattern of the obtained metal-organic framework filter, wherein No. 1 is monocrystal simulation curve, No. 2 is X-ray powder diffraction curve of the obtained metal-organic framework filter; FIG. 12 is SEM graph of the obtained metal-organic framework filter.

It can be seen from the data of Embodiments 1 to 9 and Comparative Example 1 that the X-ray powder diffraction curve (red) of the metal-organic framework material obtained after hot-pressing coincides with the monocrystal simulation curve (black), indicating that the metal-organic framework material was successfully obtained; No peak was observed in the X-ray powder diffraction curve, indicating that the product was high in purity and no impurities were generated; it can be clearly seen from the SEM graph after hot-pressing that a single metal-organic framework material having clean morphology was grown on the substrate, indicating that a highly pure metal-organic framework filter was successfully obtained. In addition, the hot-pressing method adopted in the present disclosure has such advantages of easy accessibility of raw materials, simple and convenient operation and short preparation time and the mass production of a high-purity metal-organic framework filter can be realized.

The preferred embodiments of the present disclosure have been described in detail above with reference to the accompanying drawings. However, the present disclosure is not limited to the specific details of the above embodiments. Within the technical concept of the present disclosure, various simple variations can be made to the technical solutions of the present disclosure. These simple variations all fall within the protection scope of the present disclosure.

In addition, it should be noted that the specific technical features described in the above specific embodiments can be combined in any suitable manner without contradiction. To avoid unnecessary duplication, various possible combination modes ill not be further described in the present disclosure.

In addition, various different embodiments of the present disclosure may also be arbitrarily combined as long as it does not violate the concept of the present disclosure and it should also be regarded as the disclosure of the present disclosure.

INDUSTRIAL APPLICABILITY

By the method of the present disclosure, a large amount of metal-organic framework filters with high purity can be obtained quickly and easily, thereby realizing industrialized production and application and the method has such advantages as low cost, simple operation, rapid production, batch product and high purity.

What is claimed is:
1. A method for preparing a metal-organic framework filter comprising the steps of preparing a mixture by mixing metal sources with organic ligands and forming from the mixture a metal-organic framework filter on substrates by a hot-pressing method;
   wherein the metal-organic framework is formed during the hot-pressing method.

2. The method according to claim 1, wherein metal ions in the metal sources include at least one of the groups consisting of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}+$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb5+$, $Sb^{3+}$, $Sb^{+}$, $Bi^{5+}$, $Bi^{3+}$ and $Bi^{+}$.

3. The method according to claim 2, wherein the metal ions in the metal sources include at least one of the groups consisting of $Zn^{2+}$, $Co^{2+}$ and/or $Cd^{2+}$.

4. The method according to claim 1, wherein coordination functional groups in the organic ligands include at least one of the groups consisting of $—CO_2H$, $—CS_2H$, $—NO_2$, $—OH$, $—NH2$, $—CN$, $—SO_3H$, $—SH$,

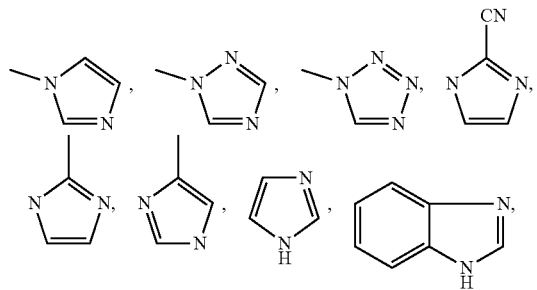

$—PO_4H_2$, $—AsO_3H$, $—AsO_4H$, $—CH(RSH)_2$, $—C(RSH)_3$, $—CH(RNH_2)_2$, $—C(RNH_2)_3$, $—CH(ROH)_2$, $—C(ROH)_3$, $—CH(RCN)_2$, $—C(RCN)_3$, $—CH(NH_2)_2$, $—C(NH_2)_3$, $—CH(CN)_2$ and $—C(CN)_3$, wherein each R in the functional groups independently represents a hydrocarbon group containing 1 to 5 benzene rings.

5. The method according to claim 4, wherein the coordination functional groups in the organic ligands include at least one of groups consisting of $—CO_2H$,

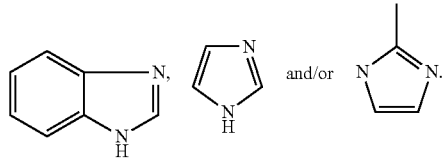

6. The method according to claim 1, wherein the usage amount of the metal sources is 0.01 mol to 5 mol with respect to 1 mol of the organic ligands.

7. The method according to claim 1, wherein the hot-pressing method has a hot-pressing temperature of 80° C. to 300° C., a hot-pressing pressure of 0.005 MPa to 6 MPa, a hot-pressing time of 3 minutes to 120 minutes and an adjustable of a hot-pressing area.

8. The method according to claim 1, wherein the substrates include at least one of the groups consisting of anodic aluminum oxide, non-woven fabric, carbon cloth, foamed nickel, copper foils, glass fiber cloth, glass fiber yarns, quartz substrate, glass substrate, and silicon substrate.

9. The method according to claim 8, wherein the substrates include at least one of the groups consisting of carbon cloth, foamed nickel, or the copper foils.

10. The method according to claim 1, wherein a process in which the metal sources are brought into contact with the organic ligands is performed with an additive and the additive includes at least one of the groups consisting of polyacrylic acid, polyacrylonitrile, polybutylene, polybutyl acrylate, polyethylene, polyethylene oxide, polyacrylic ester, polyethylene glycol, polyisobutylene, polyisobutylene oxide, polymethyl acrylate, polymethyl methacrylate, polypropylene, polystyrene, polyvinyl alcohol, polyvinyl chloride, and polyvinyl pyrrolidone.

11. The method according to claim 10, wherein the additive is polyvinyl alcohol, polyethylene glycol, polyvinyl pyrrolidone and/or polyacrylonitrile.

12. The method according to claim 10, wherein the usage amount of the additive is 0.001 mol to 0.05 mol with respect to 1 mol of the organic ligands.

13. The method according to claim 10, wherein the metal source is anhydrous zinc acetate, the organic ligand is 2-methylimidazole, and the substrate is copper foil.

14. The method according to claim 10, wherein the metal source is zinc nitrate hexahydrate, the organic ligand is 2-aminoterephthalic acid, and the substrate is foamed nickel.

15. The method according to claim 10, wherein the metal source is cobalt nitrate hexahydrate, the organic ligand is benzimidazole, and the substrate is a carbon cloth.

16. The method according to claim 10, wherein the metal source is cadmium nitrate tetrahydrate, the organic ligand is imidazole, and the substrate is a carbon cloth.

17. The method according to claim 10, wherein the metal source is cobalt nitrate hexahydrate, the organic ligand is imidazole, and the substrate is a carbon cloth.

18. The method according to claim 2, wherein the usage amount of the metal sources is 0.01 mol to 5 mol with respect to 1 mol of the organic ligands.

19. The method according to claim 4, wherein the usage amount of the metal sources is 0.01 mol to 5 mol with respect to 1 mol of the organic ligands.

* * * * *